Oct. 14, 1969    L. G. HOWELL ET AL    3,472,076
GRAVITY METER
Filed Feb. 7, 1966    5 Sheets-Sheet 5
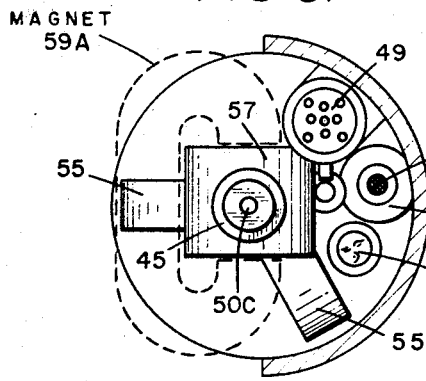
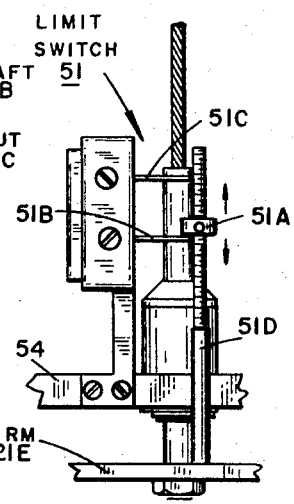
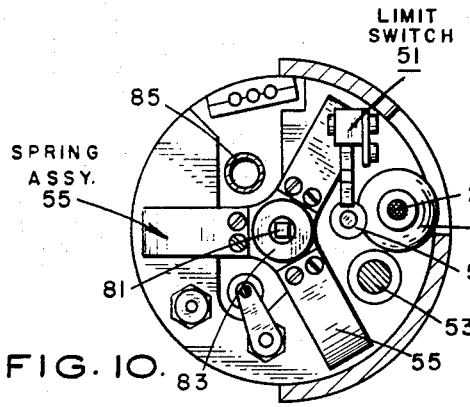
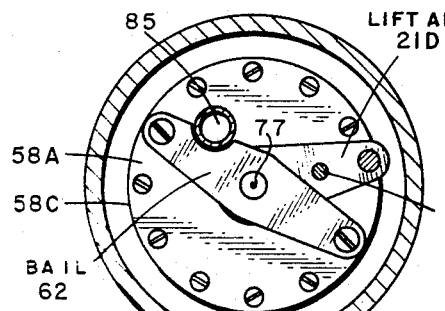
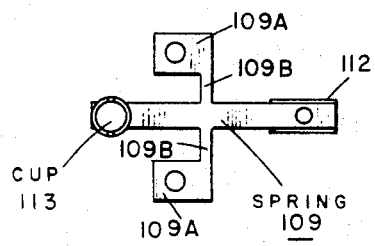
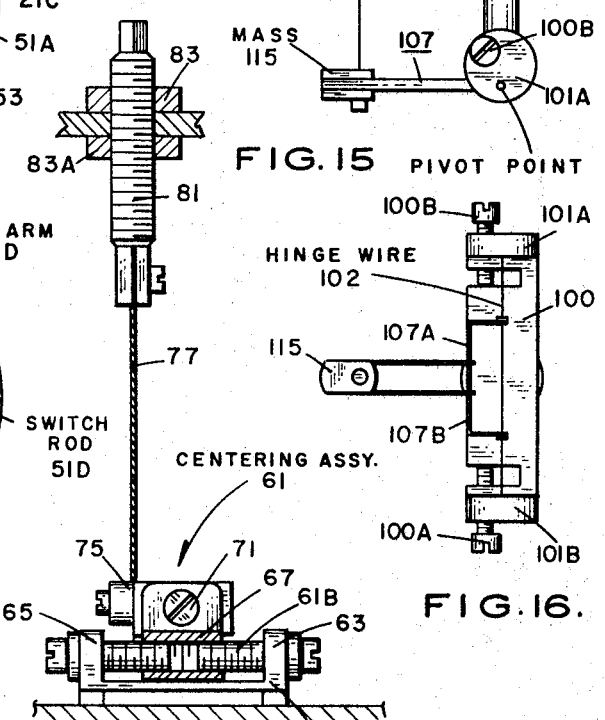
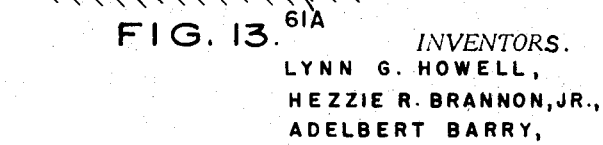
INVENTORS.
LYNN G. HOWELL,
HEZZIE R. BRANNON, JR.,
ADELBERT BARRY, United States Patent Office 3,472,076
Patented Oct. 14, 1969

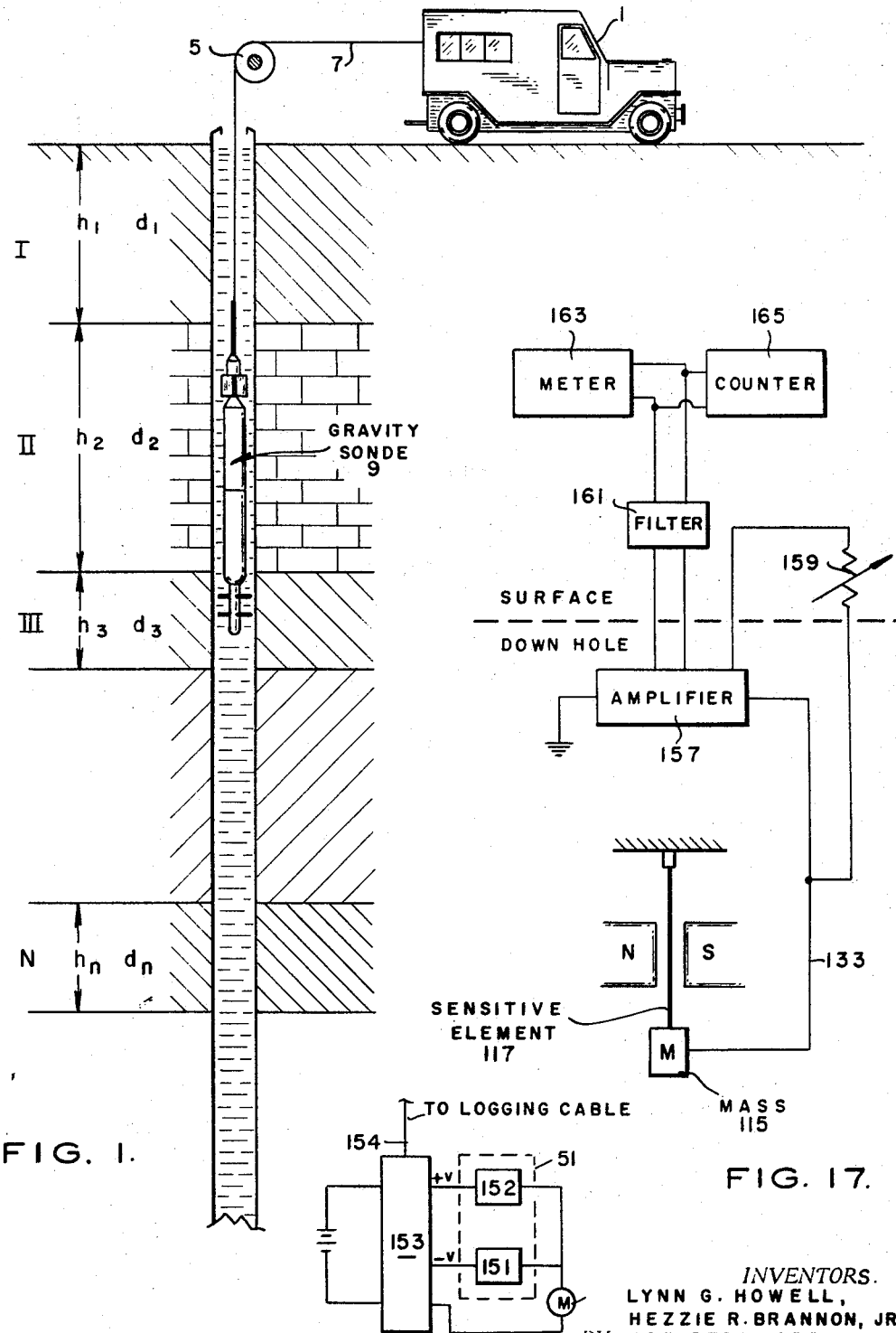

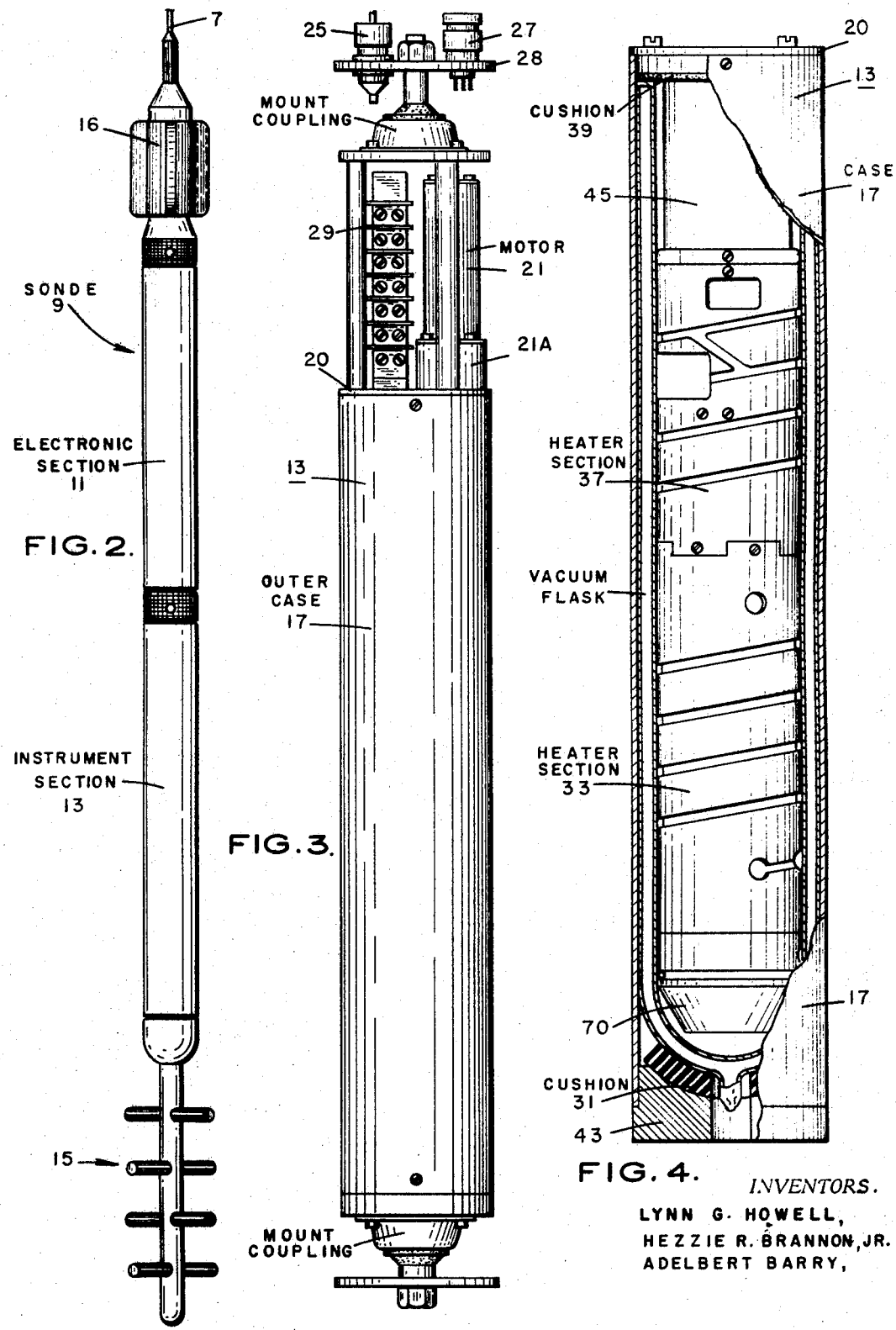

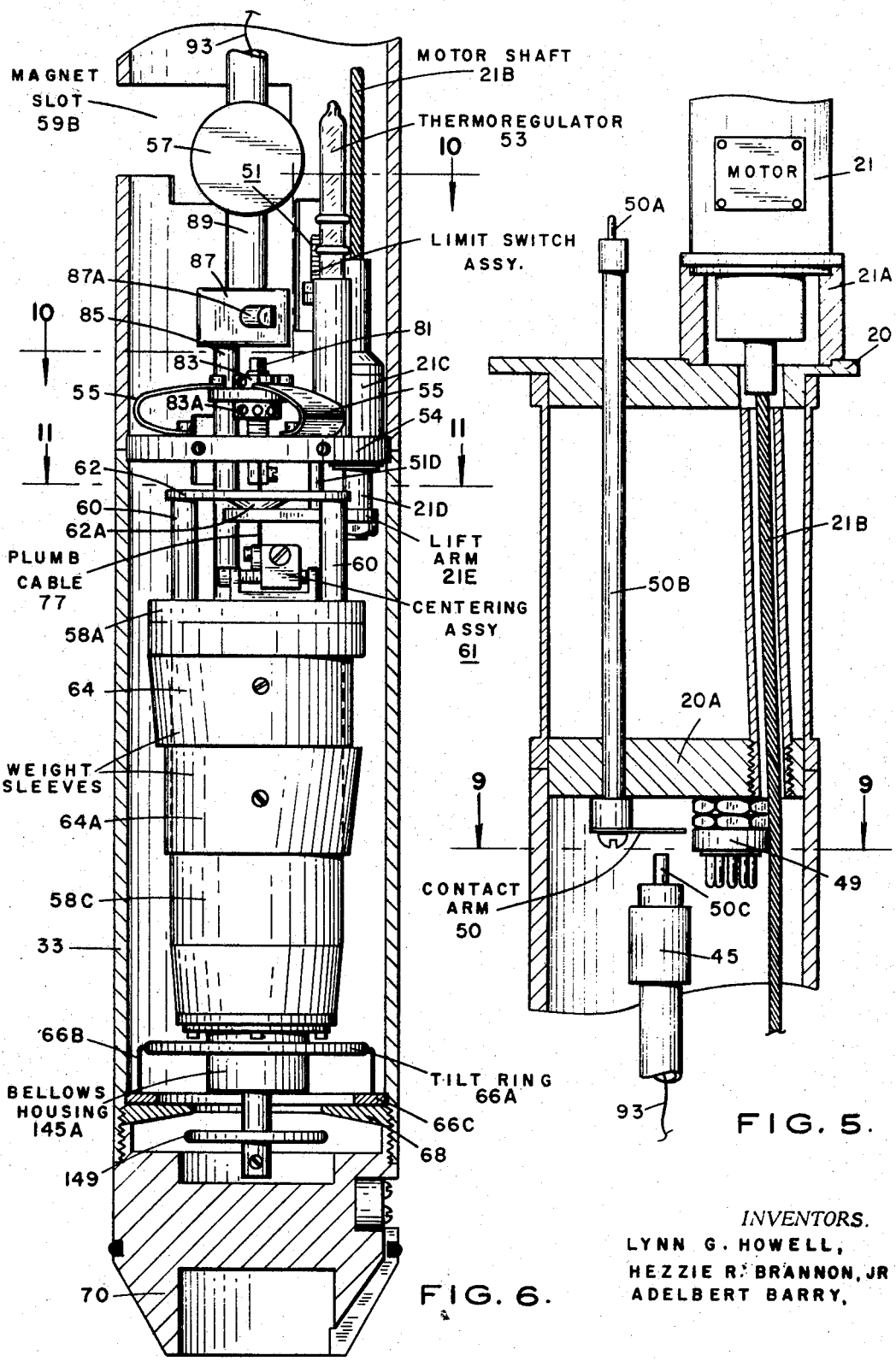

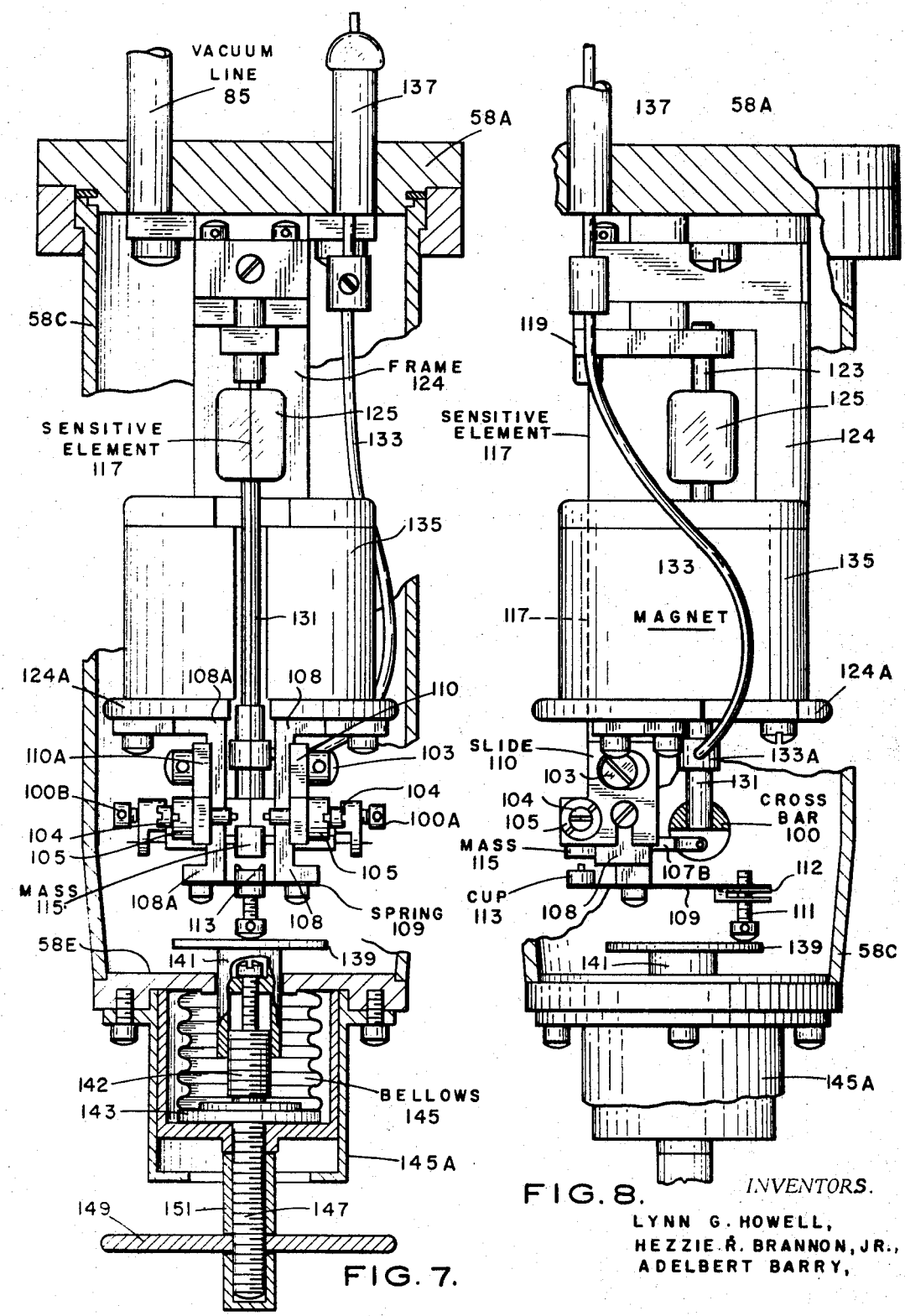

3,472,076
GRAVITY METER
Lynn G. Howell, Hezzie R. Brannon, Jr., and Adelbert Barry, Houston, Tex., assignors to Esso Production Research Company, a corporation of Delaware
Filed Feb. 7, 1966, Ser. No. 525,758
Int. Cl. G01m 1/12
U.S. Cl. 73—382                                 12 Claims

ABSTRACT OF THE DISCLOSURE

A vibrating string type gravity meter includes a vacuum-tight housing for a vertically mounted conductive string having a mass at its lower end. The string is subjected to an electrical field, and a positive feedback circuit is connected thereto for maintaining the string in oscillation at its natural frequency for a predetermined mode of oscillation. Means are provided for measuring the frequency of oscillation of the string. Tension is removed from the string by an operating means for normally engaging and lifting the mass, which is adapted to release the mass responsive to a predetermined differential pressure between the exterior and the interior of the housing. Further means is provided for selectively overriding the apparatus for engaging and lifting the mass, after attainment of the predetermined differential pressure, to selectively lift or release the mass at the will of the operator. Electrical connections are made to the string through electrically conductive hinge wire means and an electrically conductive clevis means that permits the string to vibrate with a minimum amount of interference except from the weight of the mass.

This invention relates generally to gravity meters, and more particularly to a gravity meter adapted to be used in a remote location such as a borehole or at the bottom of the sea.

For a number of years the industry has expended a substantial amount of effort in developing apparatus suitable for obtaining subsurface density information from gravity readings observed in a borehole. The apparatus that has been developed to date has been unsatisfactory because of inaccuracy, great size, and lack of ruggedness. Suitable apparatus, in addition to being extremely rugged and accurate, must have a diameter not in excess of five inches and must be capable of operating in wells having temperatures up to about 120° C. Preferably, the accuracy must be one part in ten million or better to allow density to be measured in one-thousand foot beds to better more 0.005 gr./cc., and in one-hundred foot beds to better than 0.05 gr./cc.

A form of gravity meter used heretofore for borehole use has employed a vibrating string having a mass fastened to its lower end as a sensitive element. The frequency at which the string vibrates changes as the gravitational attraction on the mass changes. When the gravity increases, the string becomes tighter and the frequency of vibration becomes higher. For the purpose of obtaining an output signal indicative of the vibrational frequency, the string is formed as an electrical conductor and is mounted in the field of a magnet. The voltage is generated across the string as it vibrates in the magnetic field. The string can then be used as the frequency controlling element of an electronic oscillator. Since this necessitates coupling the oscillator input to the string, it is manifest that coupling problems are going to be encountered, particularly when it is desired to make a direct electrical connection across the ends of the string. The connection must not interfere with the vibration of the string or the vibration will be damped. Furthermore, since the signal produced across the string is exceedingly weak, the coupling must be as efficient as possible. Since the string is of necessity very fragile, it must be clamped or otherwise protected against breakage while it is being raised or lowered through a borehole to its operating position. It is desirable to operate the string in a high vacuum (not greater than $10^{-5}$ mm. Hg) in order to obtain maximum stability, so the string is going to be in a peculiarly inaccessible position for clamping and unclamping operations.

Stability in frequency sufficient for precise gravity measurement without unduly stringent requirements on associated electronics equipment requires that the vibrating element have high mechanical Q. To avoid excessive gas damping of fiber movement and consequent reduction in Q, pressures as low as $10^{-5}$ mm. Hg are needed.

Objects and features of the invention not apparent from the above discussion will become evident upon consideration of the following detailed description of the invention taken in connection with the accompanying drawings, wherein:

FIG. 1 is a schematic representation of a well logging operation in the earth making use of the apparatus of the present invention;

FIG. 2 is an elevational view of the complete apparatus of the present invention;

FIG. 3 is an elevational view of the instrument section of the apparatus of FIG. 2 with a cover plate removed to expose certain of the component parts thereof;

FIG. 4 is a partially cut-away view of a portion of the apparatus of FIG. 3, partially in cross section, to illustrate the construction thereof;

FIGS. 5 and 6 taken together are cross-sectional views of a portion of the apparatus of FIG. 4;

FIG. 7 is a fragmentary cross-sectional view of the equipment within the portion of the apparatus of FIG. 6 designated as a weight sleeve;

FIG. 8 is a side view of the apparatus of FIG. 7;

FIG. 9 is a sectional view taken along section 9—9 of FIG. 5;

FIG. 10 is a sectional view taken along section 10—10 of FIG. 6;

FIG. 11 is a sectional view taken along section 11—11 of FIG. 6;

FIG. 12 is a top view of spring 109 of FIG. 7;

FIG. 13 is an enlarged view of the leveling assembly of FIG. 6;

FIG. 14 is an enlarged view of a portion of the apparatus of FIG. 6 obscured by thermoregulator 53;

FIG. 15 is a side view of apparatus for suspending the sensitive element 117 shown in FIGS. 7 and 8;

FIG. 16 is a bottom view of a portion of the apparatus of FIG. 15;

FIG. 17 is a simplified electrical schematic diagram of certain of the electrical components of the sonde 9 of FIG. 2 and surface control equipment associated therewith; and FIG. 18 is an electrical schematic diagram of a motor control used in the apparatus of the invention.

With reference now to FIG. 1, there is shown in schematic form apparatus for making gravity measurements in a borehole in accordance with the present invention. A conventional logging truck 1 at the earth's surface controls a gravity sonde 9 which is lowered into a borehole on a logging cable 7 by a sheave 5 suspended over the borehole. The cable 7 may be a multiconductor cable such as is conventionally used for electrical well logging purposes. The sonde 9 while being lowered through the borehole traverses a number of earth formations designated by numerals I, II, III, . . . N, each of which has a different density designated by $d_1$, $d_2$, $d_3$, . . . $d_n$. The thickness of the respective formations are designated $h_1$, $h_2$, $h_3$, . . . $h_n$. If it is desired to determine the density $d_2$ of layer II, for example, gravity measurements can be taken at the top and at the base of layer II, and the density of the layer can be determined from the formula $$\Delta g = 4\pi K h_2 d_2 - h_2(0.9406 \times 10^4)$$

This is a well-known relationship and will not be further discussed herein.

With reference now to FG. 2, the gravity sonde 9 is seen to comprise an electronic section 11, an instrument section 13, upper centralizer 16 connecting the electronic section 11 to the logging cable, and lower centralizers 15. Centralizers 16 and 15 can be conventional types of stabilizers such as are customarily used by the Schlumberger Well Surveying Corporation for logging purposes.

With reference now to FIGS. 3 and 4, there is illustrated certain of the details of construction of instrument section 13. The instrument section includes an upper portion wherein are housed a motor 21 (the function of which will become apparent below) and an electric terminal board 29 for making connections between the equipment housed in outer case 17 and the electronic section 11 of sonde 9. The electrical connections are made through a conventional nine-prong connector 27 supported by flange 28 which forms part of the upper mount coupling. The electrical leads are not shown to avoid cluttering the drawing. A shielded coaxial connector 25 is also supported by flange 28 to conduct certain weak electrical signals to an oscillator housed in the electronic section 11. The apparatus illustrated in FIG. 4 is housed within outer case 17. A thermal insulating plug is supported from an upper closure plate 20. Extending downwardly from plug 45 are an upper heater section 37, a lower heater section 33, and a heat sink plug 70. Surrounding plug 45, heater sections 37 and 33, and plug 70 is a vacuum flask 35. Flask 35 is cushioned from shock by suspension between upper cushion 39, lower cushion 31, and a lower closure plug 43 within outer case 17. Heater sections 37 and 33 are spirally slotted in order to receive electrical heater elements (not illustrated) which are serially connected with thermoregulator 53 (see FIG. 6) across a battery housed in the electronic section 11. The heater elements carried in the slots of upper heater section 37 and lower heater section 33, respectively, may be connected either in series or in parallel, as desired. The motor support 21A is bolted to upper closure plate 20.

In FIGS. 5 and 6, taken together, are illustrated the details of construction of apparatus within case 17. The shaft 21B of motor 21 extends through upper plate 20 and support plate 20A to drive lifting nut 21C which is supported on plate 54. Nut 21C is internally threaded to engage the external threads on bolt 21D, which is affixed to the lift arm 21E. Lift arm 21E is supported against rotation by a rod 54D which extends through and slidably engages plate 54. The function of the shaft 21B and lift arm 21E is to lift the housing 58C including weight sleeves 64 and 64A, which is suspended from springs 55 through a suspension member 77 connected to the top 58A of housing 58C by a centering assembly 61. Weight sleeves 64 and 64A are rings which are rotatable on housing 58C for the purpose of adjusting the center of gravity of housing 58C which is hanging on cable 77. Each ring has a heavy side so that when rotated in respect to each other, housing 58C may be made to hang centrally within heater section 33. This is a coarse adjustment. The suspension member or plumb cable 77 is affixed to the tripartite spring assembly 55 through a threaded bolt 81 and internally threaded connection members 83 and 83A. The top plate 58A of housing 58C is connected through posts 60 to a lifting bail 62 having a downwardly coning member 62A engaging a hole in the lift arm 21E. When motor 21 drives shaft 21B to rotate nut 21C, lift arm 21E will either be raised or lowered to either raise or lower housing 58C accordingly.

The details of the leveling and centering assembly 61 are illustrated in FIG. 13. Members 75 and 67 are both movable on X–Y axes by threaded shafts 71 and 61B. Member 75 is threaded for engagement with shaft 71 and member 67 is threaded for engagement with shaft 61B. Member 67 has end posts to support shaft 71 similar to end posts 63 and 65 of member 61A. Threaded shafts 71 and 61B are actually in two parts. By loosening the left screw and tightening the right screw, member 67 is moved to the right. In this manner the screws may be tightened against each other to maintain member 67 free from movement by vibrations. In the same manner, shaft 71 is actually two screws threaded into member 75 for positioning member 75 on the other axis. This adjusts the position of cable 77 relative to housing 58C and is the "fine" adjustment. It is imperative that the sensitive element 117 and mass 115 be perfectly vertical to obtain a reading. As the frame, etc., shown in FIG. 15, is attached rigidly to plate 58A, it follows that plate 58A must be perfectly horizontal when taking a reading. This is the reason for finely adjusting the X–Y leveling assembly shown in FIG. 13. Observation of this fine leveling must be done by electrically reading the frequency of the string 117 while making adjustments.

As illustrated in FIGS. 6 and 14, a limit switch assembly 51, including two limit switches 151 and 152 (see FIG. 18) having actuating arms 51C and 51B, are connected to plate 54 so as to be actuated by a nut 51A carried by shaft 51D. As illustrated in FIG. 18, the limit switches 151 and 152 are individually connected in series with motor 21 and with switch means 153 for reversing the polarity of a D.C. voltage applied to the motor from a battery carried in the electronic housing section 11. The polarity reversing means 153 may be two relays actuated through electrical leads 154 going to the surface through the logging cable. When limit switch 51 is actuated to remove power from the motor, the polarity reversing means 153 is actuated to reverse the polarity of the voltage applied to the motor through the limit switch having actuating arm 51C. When limit switch 51 is actuated, the voltage can then again be reversed through the other limit switch, which is now closed.

An electrically conductive annular tilt ring 66A (see FIG. 6) is supported on an annular insulated member 66C by support means 66B. The tilt ring 66A is electrically connected to the earth's surface by a separate electrical conductor (not shown) and is there connected in series with an electrical source and a warning light to an electrical lead going to the housing 58C. When the housing 58C (actually bellows housing 145A) contacts the tilt ring 66A, an indication will be noted at the earth's surface that the inclination of the housing relative to the lower heater 33 is greater than permissible for a gravity reading to be taken.

For reasons that will become apparent below, it is necessary that the interior of housing member 58C be at a high vacuum. To this end, an ion pump 57 is connected to the interior of the housing 58C through line 89, T-connection 87, and line 85. A roughing vacuum pump is connected to the T-connection 87 through line 87A in order to draw the interior of housing 58C, etc., down to a low vacuum, at which time line 87A is pinched off. A magnet 59A (see FIG. 9) is inserted in magnet slot 59B so that the poles thereof are on either side of the ion pump 57.

A high voltage source is then applied to the conductor 50A in feed-through insulator 50B, and the insulator 50B is lowered until the contact arm 50 thereof engages terminal 50C, which is connected to lead 93 going to the ionizing potential plates of the ion pump 57. Sleeve 45A and insulator 45 insulatively support line 93. When the ion pump is thus energized, the interior of the housing 58C, etc., will be pumped down to operating vacuum. The ion pump may be a Varian appendage pump Model No. 913–0002, manufactured by Varian Associates of Palo Alto, Calif.

The apparatus contained within housing section 58C is illustrated in FIGS. 7, 8, 12, 15, and 16. As is most perspicuously illustrated in FIG. 15, the sensitive element 117 having a mass 115 at the lower end thereof is affixed at it upper end to a horizontal bar 119 which may be formed of Kovar or other electrically conductive material. The horizontal bar 119 is in turn connected to a frame member 121 affixed to a magnet frame 124, which is in turn secured to plate 58A. The sensitive element 117 preferably is a tungsten wire. Typical suitable dimensions are about 5.0 centimenters in length and about .00042 centimeter in diameter. The length-to-diameter ratio is important to minimize the effect of elastic properties. The mass 115 is affixed to a clevis member 107, the arms 107A and 107B of which are soldered to a horizontal hinge wire 102. This construction is most perspicuously illustrated in FIG. 16. The hinge wire 102 is affixed to the outer plates 101A and 101B of a cross bar 100 which has a hemispherical cut therein in the manner illustrated in FIG. 8. The cross bar is slotted so that screws 100A and 100B can take up any slack in the hinge wire 102. Preferably, the horizontal bar 101 is formed of Kovar. Bars 101 and 119 are interconnected by vertical frame members 131 and 123, which are connected together by a glass insulating member 125. Frame member 131 preferably is formed of tungsten and frame member 123 is formed of Kovar. The upper end of frame member 131 is tipped with Kovar to facilitate the bond thereof to glass insulating member 125. As best illustrated in FIG. 8, a coaxial electrical conductor 133 is connected to frame member 131 by a conductive clamp 133A. Coaxial conductor 133 is connected to apparatus to be described below, housed in electronic sonde section 11 through connectors 137 and 25. The sensitive element 117 extends between the opposed poles of a permanent magnet 135 which is secured by magnet frames 124 and 124A and is capable of exerting a field strength of at least 4500 gauss.

The sensitive element 117 is fragile; therefore, it is desirable that strain be removed from the sensitive element when the logging apparatus is being moved. For this purpose there is provided a cup member 113 for engaging the mass 115 to lift the mass slightly and, in effect, clamp it against movement when a reading is not being taken, thereby also relaxing the weight of the mass from the sensitive element 117. Supported from magnet frame 124A are two stop brackets 108 and 108A extending downwardly to furnish a mounting at their lower ends for spring 109. Slidably adjustable on the stop brackets 108 and 108A are stop screw carriers 110 and 110A. Stop screws 104 may be run in close to the slides of mass 115 to limit the horizontal movement of mass 115. Stop screw carriers 110 and 110A may be moved vertically upon brackets 108 and 108A to bring the stop screws 104 close to the top of mass 115 to afford a vertical stop to the mass when it is lifted by the spring 109 and cup 113. Eccentric headed screws 103 allow fine adjustment of the carriers 110; locking of the carriers is by means of the screws. Lock nuts 105 allow for securing stop screws 104 in their adjusted positions. The cup member 113 is attached at one end of a spring 109, the details of construction of which are best illustrated in FIG. 12. The spring has two arms 109A connected to the spring body by reduced sections 109B to provide a pivot point about which the spring body rotates. The arms 109A are affixed to flanges depending from the magnet frame 124A, as illustrated in FIG. 7. A bolt 111 is affixed to the opposite end of the spring from cup 113 by means of a lock nut 112. The bolt depends from the spring and engages a plate 139 of an actuator member 141, which extends through the closure member 58E affixed to housing section 58C. Actuator 141 is threaded upon a lower shaft 142 (for adjustment thereon) having a central disc section 143 and a lower threaded shaft 147. A bellows 145 is affixed to the disc section 143 and to closure member 58E for the purpose of sealing the opening in the closure member 58E through which actuator 141 extends. The lower shaft 147 is connected to a sheath member 151 having an annular flange 149 extending thereabout. The diameter of the flange is greater than the inner diameter of an annular member 68, which has an upwardly dished lower surface for engaging the annular member 149. The annular member 68 is connected to the lower heater section 33.

In its normal position (i.e., at normal atmospheric pressure), cup 113 engages mass 115 because member 141 is pulled away from the bolt 111 by the bellows 145. However, when the pressure within the housing is sufficiently reduced, the bellows 145 are partially collapsed, which causes actuating member 141 to be pulled into the housing so that the plate 139 thereof will engage bolt 111 and actuate spring 109 to pivot cup 113 away from mass 115.

In FIG. 17 there is shown the electrical connections between the sensitive element 117, apparatus in the electronic section of the sonde housing, and the control equipment at the earth's surface. The electrical lead 133 from the mass 115 is connected to the input circuit of a positive feed-back amplifier 157. Since the other end of the sensitive element 117 is connected to housing ground, the amplifier 157 also is grounded. The oscillating voltage across sensitive element 117 thus is coupled to the positive feed-back amplifier and control the frequency of the output signal thereof. The amplitude of the output signal from the amplifier is controlled by a feed-back resistor 159 connected in the amplifier in the usual manner. The leads from the positive feed-back amplifier to the control resistor 159 go through the logging cable so that the resistor 159 can be connected at the earth's surface. The output circuit of the amplifier 157 is connected through logging cable leads to a very narrow band pass filter 161, which may be a tuning fork. Preferably, the band pass of the filter is adjustable and does not exceed one cycle in width. The output circuit of the filter 161 is connected to a frequency meter 163 and an electronic counter 165. The function of meter 163 is to obtain an approximate indication of the frequency of the output signal of the amplifier 157 so that the tuning fork 161 may be adjusted thereto. The counter 165 is of the type that produces an accurate count of the number of oscillations in the output signal of filter 157 in a given period of time. Preferably, the counter 165 also provides an indication of the time required for a given count to be registered therein so that an extremely accurate determination of the frequency of the signal passed by filter 161 may be obtained.

After the pressure in the housing has been reduced to a suitable value by a roughing pump connected to the T-connection 87, a high-voltage connection is applied to the ion pump 57 and a magnet such as 59A is inserted in slot 59B so that the pressure is reduced to a desired value. This will release mass 115 by pulling cup 113 away therefrom, as described above. Motor 21 is thereupon actuated to raise the housing 58C including weight sleeves 64 and 64A until annular member 149 engages annular member 68. Actuating member plate 139 will then be pulled away, against the vacuum in housing 58C, from bolt 111 so that cup member 113 again engages mass 115. The housing may then be lowered into a bore-hole to a level at which it is desired to take a reading. The voltage on the motor 21 is reversed so that the lift arm 21E is lowered, thus lowering the housing section 58C and releasing the mass 115. Amplifier 157 in effect drives the sensitive element 117 so that a voltage is produced across the sensitive element which controls the frequency of oscillation of the feed-back amplifier. After a reading is taken by counter 165, the direction of rotation of the motor is again reversed so that cup 113 again engages mass 115. Generally speaking, a period of between 15 and 20 minutes should be provided before a reading is taken and after the mass attached to the sensitive element has been released so that the operation of the apparatus can become stable.

The invention is not to be restricted to the specific structural details, arrangement of parts, or circuit connections herein set forth, as various modifications thereof may be effected without departing from the spirit and scope of this invention.

What is claimed is:

1. In a vibrating string gravity meter including a first vacuum-tight housing, a vertically mounted conductive string in the housing having a mass at the lower end thereof, means for maintaining said string in oscillation at its natural frequency for a predetermined mode of oscillation, and means for measuring the frequency of oscillation of the string, the improvement comprising:

first operating means in said first housing for normally engaging said mass to remove tension from the string, and adapted to release the mass responsive to a predetermined differential pressure between the exterior and interior of said first housing; and second operating means for selectively overriding said first operating means after attainment of said predetermined differential pressure to cause said first operating means to selectively engage and disengage said mass.

2. The apparatus of claim 1 wherein said first operating means comprises:

first means in the housing for normally engaging said mass to lift the mass and remove tension from the string, and having an actuated position whereat said mass is released; and second means responsive to a predetermined differential pressure between the exterior and interior of said housing to actuate said first means and release said mass.

3. The apparatus of claim 2 wherein said second operating means includes third means for engaging said second means for moving said second means in opposition to said differential pressure to permit said first means to engage said mass.

4. The apparatus of claim 2 wherein said second mass further includes a rod projecting below said first housing and a first annular member surrounding and affixed to said rod, and wherein said apparatus further includes an elongated outer housing surrounding said first housing, means for longitudinally moving said first housing within said outer housing, and a second annular member having a central opening smaller than said first annular member, positioned between said first housing and said first annular member for pulling said second means away from said first means by longitudinal upward movement of said first housing within said second housing.

5. The apparatus of claim 4 wherein said means for longitudinally moving said first housing within said outer housing further includes a reversible electric motor connected to said outer housing, said motor including an output shaft, means including spring means centrally located in said outer housing and connected thereto for centrally suspending said first housing in said outer housing, a lift arm connected to said first housing, and means connected to said shaft and said lift arm for raising and lowering said lift arm in accordance with the direction of rotation of said motor.

6. The apparatus of claim 2 wherein said second means further includes elongated means for engaging said first means, and longitudinally movable relative to said first housing and projecting through the lower end of said first housing, and said apparatus further includes bellows means connected to said first housing and said elongated means for sealing between said first housing and said elongated means and for permitting longitudinal movement therebetween.

7. In a vibrating string gravity meter including a first vacuum-tight housing, a vertically mounted conductive string in the housing having a mass at the lower end thereof, means for maintaining said string in oscillation at its natural frequency for a predetermined mode of oscillation, and means for measuring the frequency of oscillation of the string, the improvement comprising:

first operating means in said first housing for normally engaging and lifting said mass to remove tension from the string, and adapted to release the mass responsive to a predetermined differential pressure between the exterior and interior of said first housing;

second operating means for selectively overriding said first operating means after attainment of said predetermined differential pressure to cause said first operating means to selectively engage and disengage said mass;

first support and electrical terminal means secured to the upper end of said string;

electrically conductive lower support and electrical terminal means including hinge wire means insulatively connected to said first means; and electrically conductive clevis means connected to said mass and to said hinge wires.

8. The apparatus of claim 7 wherein said first operating means comprises first means in the housing for normally engaging said mass to lift the mass and remove tension from the string, and having an actuated position whereat said mass is released; and second means responsive to a predetermined differential pressure between the exterior and interior of said housing to actuate said first means and release said mass.

9. The apparatus of claim 8 wherein said second operating means includes third means for engaging said second means for moving said second means in opposition to said differential pressure to permit said first means to engage said mass.

10. The apparatus of claim 8 wherein said second means further includes a rod projecting below said first housing and a first annular member surrounding and affixed to said rod, and wherein said apparatus further includes an elongated outer housing surrounding said first housing, means for longitudinally moving said first housing within said outer housing, and a second annular member having a central opening smaller than said first annular member, positioned between said first housing and said first annular member for pulling said second means away from said first means by longitudinal upward movement of said first housing within said second housing.

11. The apparatus of claim 8 wherein said second means further includes elongated means for engaging said first means, and longitudinally movable relative to said first housing and projecting through the lower end of said first housing, and said apparatus further includes bellows means connected to said first housing and said elongated means for sealing between said first housing and said elongated means and for permitting longitudinal movement therebetween.

12. The apparatus of claim 11 wherein said means for longitudinally moving said first housing within said outer housing further includes
 a reversible electric motor connected to said outer housing, said motor including an output shaft,
 means including spring means centrally located in said outer housing and connected thereto for centrally suspending said first housing in said outer housing,
 a lift arm connected to said first housing, and
 means connected to said shaft and said lift arm for raising and lowering said lift arm in accordance with the direction of rotation of said motor.

References Cited

UNITED STATES PATENTS

| | | | |
|---|---|---|---|
| 1,995,305 | 3/1935 | Hayes | 73—382 |
| 2,279,261 | 4/1942 | Crawford et al. | 73—382 |
| 2,304,737 | 12/1942 | Maeder | 73—382 |
| 2,349,404 | 5/1944 | Blair et al. | 73—382 |
| 2,953,023 | 9/1960 | Goodell | 73—382 |

JAMES J. GILL, Primary Examination

HERBERT GOLDSTEIN, Assistant Examiner